United States Patent
Briscoe

(10) Patent No.: US 7,608,010 B2
(45) Date of Patent: Oct. 27, 2009

(54) THRUST BEARING ASSEMBLY FOR AUTOMATIC TRANSMISSION REAR PLANETARY

(76) Inventor: James D. Briscoe, 1014 Highams Ct., Woodbridge, VA (US) 22191

( * ) Notice: Subject to any disclaimer, the term of this patent is extended or adjusted under 35 U.S.C. 154(b) by 401 days.

(21) Appl. No.: 11/497,281

(22) Filed: Aug. 2, 2006

(65) Prior Publication Data
US 2008/0032849 A1    Feb. 7, 2008

(51) Int. Cl.
*F16C 33/46* (2006.01)
*F16C 33/58* (2006.01)
*F16H 57/08* (2006.01)

(52) U.S. Cl. .................................. 475/331; 384/621
(58) Field of Classification Search ................ 475/331, 475/348; 384/621–623
See application file for complete search history.

(56) References Cited

U.S. PATENT DOCUMENTS

| | | | | |
|---|---|---|---|---|
| 3,829,181 A | * | 8/1974 | Gunther et al. | 384/455 |
| 4,042,285 A | * | 8/1977 | Dorsch | 384/621 |
| 6,929,578 B1 | * | 8/2005 | Rowell | 475/331 |

* cited by examiner

*Primary Examiner*—Tisha D Lewis
(74) *Attorney, Agent, or Firm*—Nixon & Vanderhye, P.C.

(57) ABSTRACT

The invention generally relates to the improved performance of the rear planetary gear in an automobile transmission. In particular, the invention relates to a new and improved thrust bearing assembly capable of sustaining performance of the rear planetary under more severe stress, and prolonging its life over much longer periods of time, than the OEM bearing. More particularly, the invention relates to a novel bearing assembly designed to replace the OEM bearings in the General Motors [GM] 4L60, 4L60E, and 700R4 transmissions which have a long history of rear planetary failures.

14 Claims, 7 Drawing Sheets

CROSS-DRILLED LUBRICATION PIN

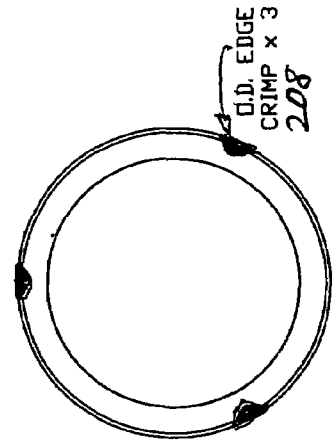
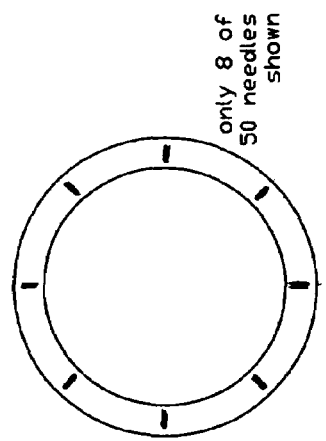
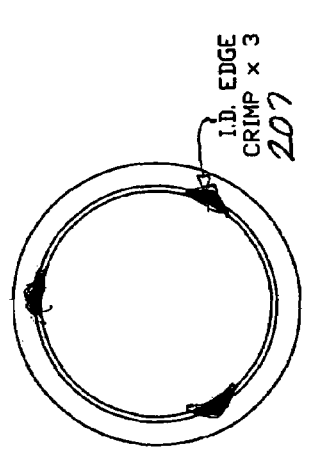
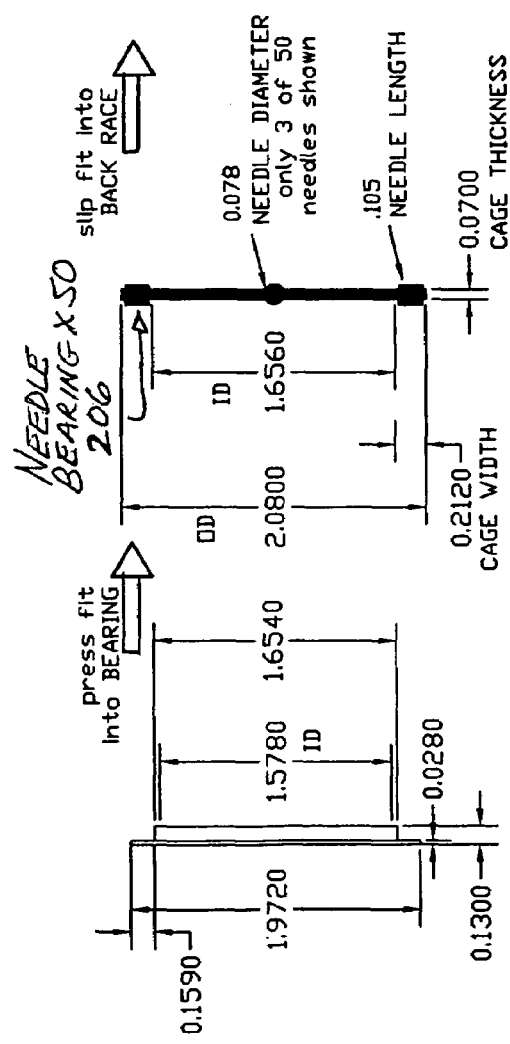
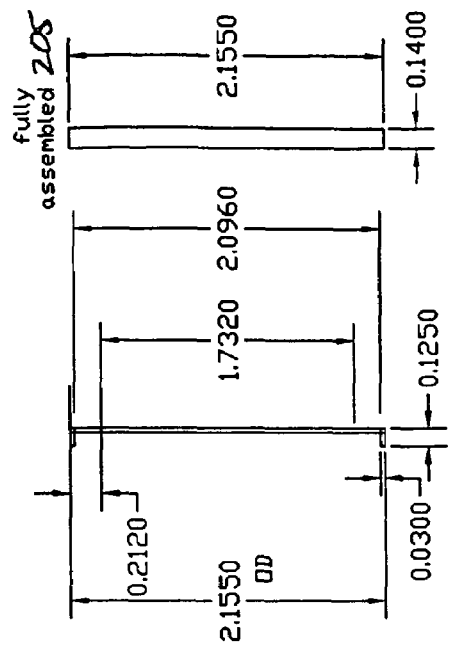
FIG. 4 ORIGINAL OEM BEARING 201

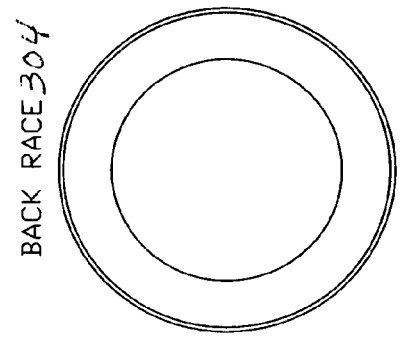
BACK RACE 304
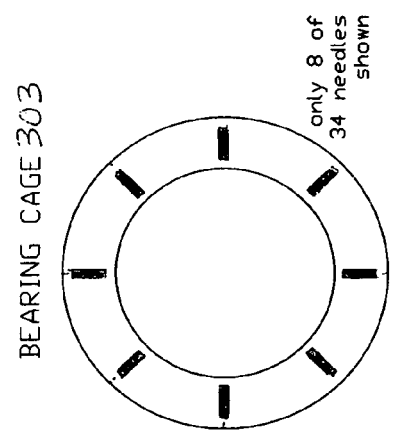
BEARING CAGE 303
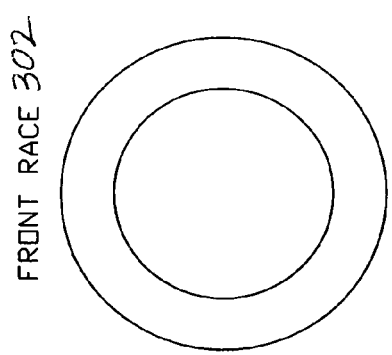
FRONT RACE 302
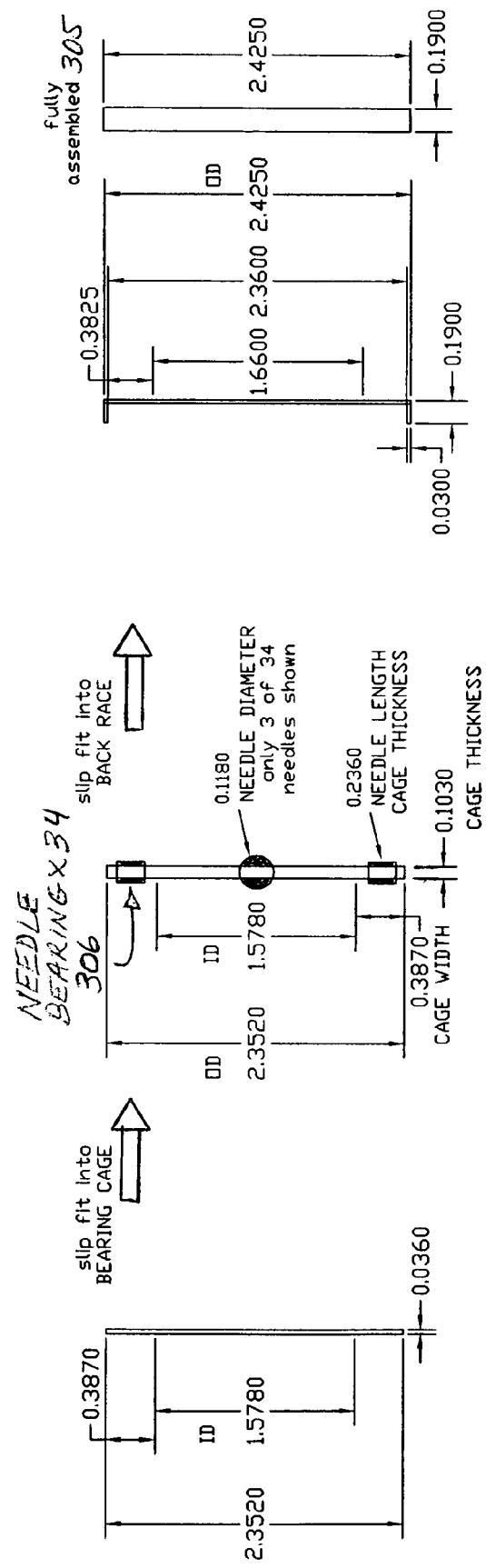
IMPROVED THRUST BEARING ASSEMBLY 301
FIG. 5

Comparison of original OEM Bearing to the larger Modified Bearing Assembly
Modified Thrust Needle Roller Bearing for GM 4L60 Rear Planetary Gear

| Data Point | Bearing Parameter | Units | OEM Bearing | Modified Bearing | Relative Increase | % increase over OEM |
|---|---|---|---|---|---|---|
| | Needle Bearings | | | | | |
| [1] | Diameter | inches | 0.078 | 0.118 [3mm] | 0.04 | 51% |
| [2] | Length | inches | 0.105 | 0.236 [6mm] | 0.131 | 125% |
| [3] | Area * | square inches | 0.035 | 0.109 | 0.074 | 210% |
| [4] | Size ** | cubic inches | 0.0005 | 0.0026 | 0.0021 | 414% |
| | Bearing Cage | | | | | |
| [5] | OD | inches | 2.080 | 2.352 | 0.272 | 13% |
| [6] | ID | inches | 1.656 | 1.578 | -0.078 | -5% |
| [7] | Width of Cage*** | radial inches | 0.212 | 0.387 | 0.175 | 83% |
| [8] | Area of Cage**** | square inches | 1.244 | 2.389 | 1.1449 | 92% |
| [9] | Thickness of Cage | inches | 0.070 | 0.103 | 0.033 | 47% |
| | Bearing Assembly | | | | | |
| [10] | OD | inches | 2.155 | 2.425 | 0.27 | 13% |
| [11] | ID | inches | 1.578 | 1.578 | 0 | 0% |
| [12] | Width of Race | radial inches | 0.289 | 0.424 | 0.135 | 47% |
| [13] | Area of Race*** | square inches | 1.692 | 2.663 | 0.971 | 57% |
| | Bearing Seat in Frame | | | | | |
| [14] | Diameter | inches | 2.285 | 2.431 | 0.146 | 6% |
| [15] | Depth of Pocket | inches | 0.075 | 0.122 | 0.047 | 63% |
| [16] | Size of Seat***** | cubic inches | 0.3076 | 0.5663 | 0.2587 | 84% |

\* Area of surface is 2 x Diameter area + Length x circumference =
2 x 3.1416 x (D/2)squared + 3.1416 x D x Length =
3.1416 x D x (D/2 + L) square inches \*\* Size [or volume] is Diameter area x Length =
3.1416 x ((D/2)squared x L) cubic inches \*\*\* Width of Cage/Race is Radius of OD - Radius of ID, defining a radial distance =
(OD/2) - (ID/2) radial inches \*\*\*\* Area of Cage/Race is Area of OD - Area of ID, defining a circular ring =
3.1416 x ((OD/2)squared - ((ID/2)squared) square inches \*\*\*\*\* Size of Bearing Seat is Diameter area x Depth of Pocket, defining a cylinder =
3.1416 x ((D/2)squared x Depth) cubic inches

FIG. 6

Advantages of the Modified Bearing Assembly over the OEM Bearing
How the larger modified bearing concept improves on the OEM configuration

Needle Bearings ===>
- [1] Needle Diameter and Length are over twice as large, which yields:
- [2] a diameter that turns at *1/2 the speed* of the OEM -- yielding less friction, less heat
- Note 1: a needle *over twice as long* as the OEM to distribute the wear across more area
- [3] an increase of 113% yields an *exponential 953% increase* in dynamic load rating
- [4] *over twice* the Surface Area to dissipate internal heat faster under normal conditions
- *over 4 times* the Overall Size to absorb greater heat buildup under severe stress

Bearing Cage ===>
- [5] The ID is tighter and the OD is only 13% larger than the OEM bearing -- yet:
- [6] the minimal increase in cage OD means *less metal removed* from the bearing seat
- [7] the tighter ID eliminates wear due to .078" oscillation of the looser OEM ID
- [8] the cage is *over 80% wider* which radiates heat outward faster from the center
- [9] the cage is *over 90% larger* which distributes the force over more area, and
- the cage is *almost 50% thicker* which absorbs more heat and greater force

Bearing Seat ===>
- [10] This huge increase in bearing size comes at minimum cost in space consumed:
- [11] the minimal increase in overall OD means *less metal removed* from the bearing seat
- [12] the exact match on bearing assembly ID means *perfect mating* with the sun gear
- [13] i.e., the snug-fit bearing seat is only 6% wider and less than *.050" deeper*
- the free-floating front washer *distributes the load* across all needles evenly, and
- Note 2: the free-float allows the washer to rotate, which *further reduces needle rotation*

Bearing Seat in Frame
- [14] The minimal increase in overall size of seat permits a much larger, more robust bearing
- [15] the minimal increase in bearing OD translates to *just 6% increase in seat diameter*
- [16] 63% greater seat depth allows a thicker bearing that can resist sudden impulse force
- *Just an 84% increase in Size of Seat allows a more robust bearing over 4 times larger*

Bottom Line ===>
- overall [A1] the Modified Bearing uses the severely-confined bearing space to greatest advantage:
- overall [A2] Less heat being generated ==> *less demand for limited-access fluid lubrication*
- overall [A3] More heat being radiated away ==> *less chance of failure due to heat buildup*
- Distributed load and less friction ==> *significant extension of bearing life*

FIG. 7

THRUST BEARING ASSEMBLY FOR AUTOMATIC TRANSMISSION REAR PLANETARY

FIELD OF THE INVENTION

The invention generally relates to the improved performance of the rear planetary gear in an automobile transmission. In particular, the invention relates to a new and improved thrust bearing assembly capable of sustaining performance of the rear planetary under more severe stress, and prolonging its life over much longer periods of time, than the OEM bearing. More particularly, the invention relates to a novel bearing assembly designed to replace the OEM bearings in the General Motors [GM] 4L60, 4L60E, and 700R4 transmissions which have a long history of rear planetary failures.

BACKGROUND OF THE INVENTION

It is understood that any reference hereinafter to the 4L60 transmission also references the 4L60E and 700R4 transmissions, in that all 3 variations are functionally identical at the point of novelty of the instant invention, the crucial thrust bearing assembly of the rear planetary gear. The term "present bearing assembly" is also used interchangeably with "bearing mod" in that the present invention modifies the original OEM bearing configuration.

General Motors [GM] introduced the 4L60 automatic transmission back in 1981, and it is still being manufactured in upgraded format today. Early on, it displayed a problem with premature failure in the rear planetary. This failure could not generally be attributed to the otherwise-stable reaction carrier gears and housing. Rather, it became clear that the primary problem was due to rear thrust bearing failure, primarily from overheating.

GM made several attempts to correct this problem, about the same time that the 4L60E electronic upgrade mod was introduced in 1993. GM engineers apparently thought that they could resolve the overheating failure by simply improving the flow of lubrication [lube] into the bearing. More specifically, GM introduced a pattern of 4 cross-drilled lube pins on the back face of the rear planetary [FIG. 3] which were clearly designed to improve lube flow. They also mounted a lube shield on the back of the rear planetary in an effort to "catch" extraneous fluid and force it down into the 4 lube pins.

However, the bulk of 4L60 repairs in the time since then have demonstrated that GM's improved lube passages failed to cure the bearing's overheating problem—that is, the failure rate today is about the same as it was prior to the 4-pin mod. As a case in point, for one failed 4L60, the lubrication intended for the rear planetary [containing the present bearing mod] was completely shut down due to failure of the front planetary. In this extreme instance, the four outboard rear planetary gears actually melted from the resulting extreme heat—yet the larger new thrust bearing, centered between the melted gears, remained completely intact and functional. This confirms that the problem with the rear planetary thrust bearing is not how well it is being lubricated, but rather, how well it can dissipate heat.

The significance of this failure becomes even more remarkable when the scale of the following four observations is taken into account [see below]:

[1] The large range of GM vehicle platforms that have used and/or still use the 4L60/4L60E/700R4 transmission

[2] The large percentage of failures showing up at independent repair shops that can be directly attributed to the 4L60 planetary gear bearing

[3] The fact that this 4L60 failure has persisted for 20-odd years despite the apparent best efforts of GM engineers to improve rear planetary lubrication

[4] The present new 4L60 bearing mod, designed to cure this long-standing and wide-ranging problem, has held up under prolonged worst-case testing, without any wear

[1] GM Platforms Using the 4L60 Transmission

Chevys with overdrive, including SS Impala, Caprice, Camaro, Corvette

Chevy and GMC SUVs, including Suburban, Tahoe, Blazer and Jimmy

Chevy and GMC Pickup Trucks, including the S10 1500/2500 series

Chevy and GMC Vans, including Astrovan and Yukon

Chevy and Pontiac Station Wagons

[2] Survey Revealing Percentage of Failures Due to 4L60 Rear Planetary

An informal survey of 30 randomly-selected independent transmission shops was conducted to get first-hand anecdotal data on the percentage of failures that veteran shops have experienced over the years. These repair shops are the critical juncture where failures of every type come pouring in. These shops were randomly selected, and only shops that qualified with at least 10 years experience were considered. They were also drawn from 22 different states to help account for variations in terrain and weather across the U.S. Each manager/rebuilder was asked, "when rebuilding the 4L60 transmission, in what percentage of these units must you install a rear planetary because the planetary failed?" Results of this poll confirmed the long-term problem:

Average failure rate due to rear planetary was 35% across all 30 shops

All responses fell in a range of 20-50%, after high/low were thrown out

Most shops responded with a range of values, most commonly 30-40%

Only 4 shops clocked their failure rate on the low side at 10% or 10-20%

As many as 9 shops in 7 different states clocked their failure rate on the high side at 50%

The inventor's shop has recorded a 40% failure rate, both before and after the 4-pin lubrication mod

[3] 4L60 Planetary Failure Rate of 35% has Held Steady Over Time

From these 30 transmission shops, the survey further confirmed that the failure rate due to the rear planetary has not changed much, if at all, in the last 20 years, including GM's transition from the original 4L60 to the electronic 4L60E, and including GM's lube flow mod which was aimed directly at this problem. This is a catastrophic failure rate, considering that the root cause is a relatively small and inexpensive rear thrust bearing.

[4] Present Bearing Mod Validated by Worst-Case Drag Racing Trials

A local racing enthusiast was experiencing repeated rear planetary failures in his 4L60, while trying to drag race down a ¼-mile track. To avoid these persistent costly teardowns, he turned to the present inventor to solve this nagging riddle. After considerable research and static testing, the present bearing mod prototype emerged. As a "trial-by-ordeal" validation across a prolonged period of time, the ¼-mile drag strip "hole shots" pose perhaps the toughest maximum-force, accelerated-wear tests possible for a new bearing assembly. This drag-racing 4L60, with prototype rear planetary bearing installed, has produced the following exemplary results across 1½ years without a single flaw or the slightest hint of trouble:
- The car was a 1969 Pontiac Firebird, driven daily for a total of 12K miles
- This 3600-lb street car generates 450 HP/500 ft-lbs torque @ the wheels, 560 HP/600 ft-lbs @ the flywheel
- 12 visits to the track across 1½ years, with 4-12 "hole shots" per visit, plus many additional trials with slicks
- In addition, each drag race was preceded by one or more "burnouts" to tire seizure of 8-10 seconds each @5000 rpm
- All of this tallies up to over 200 successful "hole shots" along with their 200+ associated "burnouts"
- Best drag-race results: ¼-mile track @ 11.46 seconds/ 117.7 mph, ⅛-mile track @7.30 seconds/94.26 mph
- After this severe abuse across 1½ years, this drag-racer transmission was removed and torn down for inspection [teardown was recorded]
- Teardown inspection results: there was no visible or measurable wear on any surface or dimension of the prototype bearing
- Hence, with no actual sign of wear after 200+ drag racing hole shots, the present bearing's time-to-failure has yet to be established
- Moreover, since this was the $1^{st}$ prototype bearing, all of this exemplary performance record was achieved without the incredibly durable Nickel Boron plating now being offered as a high-performance upgrade The apparatus and methodology embodying the present invention may be implemented in many different forms. Specific embodiments thereof will be shown in the following drawings and described in detail herein, with the understanding that the present disclosure is considered only an illustration of the principles of the invention. This description is not intended to limit the invention to the specific embodiments described and illustrated herein.

BRIEF DESCRIPTION OF THE DRAWINGS

FIG. 4 shows dimensions of the 3 parts comprising the OEM bearing assembly—namely, the front race, the bearing cage, and back race—with all the critical OEM bearing and cage data being tied together in FIG. 6;

FIG. 5, like FIG. 4, shows dimensions of the 3 parts comprising the present modified bearing assembly—namely, the front race, the bearing cage, and back race—with all the critical OEM bearing and cage data being tied together in FIG. 6;

FIG. 6 is a chart comparing 16 data parameters side-by-side between the OEM bearing and the modified bearing assembly, showing the percent increase in each parameter of the new bearing versus the OEM bearing; and FIG. 7 is a chart delineating the primary advantages of the larger modified bearing assembly over the OEM bearing, as signified by each of the 16 data parameters listed in FIG. 6, including three overall performance advantages gained by the collective increases in size.

DETAILED DESCRIPTION OF THE ILLUSTRATIVE EMBODIMENTS

Figure 1:
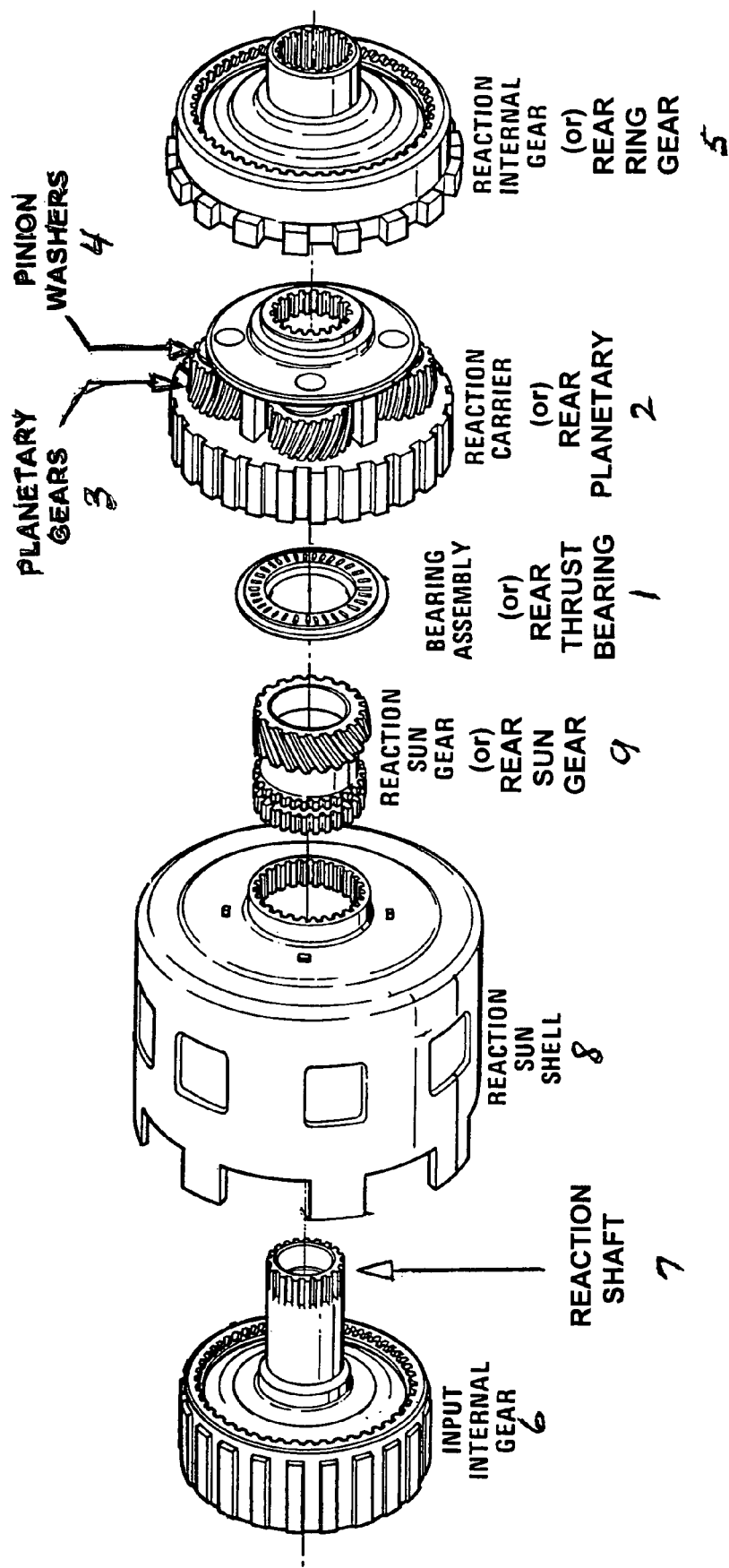
FIG. 1 is an exploded view of the reaction gear set at the rear of the 4L60 transmission, which acts as the power train out to the output shaft, including the "rear thrust bearing assembly" of the instant invention.

FIG. 1 has been confined for simplicity to an exploded view of the key 4L60 transmission elements that interact with the rear planetary, including the following parts of the successive power train out, along with their commonly used trade names [also listed on FIG. 1]:
- the input internal gear 6, with its reaction shaft 7, enshrouded by
- the sun gear shell 8, with its large bell housing, which splines with
- the reaction sun gear 9, which runs up against the front race of
- the bearing assembly, or rear thrust bearing 1, seated at the back of
- the reaction carrier, or rear planetary 2, which also houses [4] pinions, or planetary gears 3, bounded by [2] pairs of washers 4, and next splines with
- the reaction internal gear, or rear ring gear 5, which splines with
- the output shaft [not shown] leading away from the transmission Bearing Assembly 1

Description of the novel new bearing assembly, or rear thrust bearing 1, is discussed below as the "preferred embodiment" with respect to its novel configuration in FIG. 5, and with respect to its robust dimensions in FIG. 6.

Pinion Washers 4

To further ensure the heat- and wear-resistance integrity of the rear planetary, the instant invention embraces another novel improvement—namely, nickel-boron plating the pairs of pinion washers 4 that lie at either end of the [4] planetary gears 3, totaling 32 washers in all. Although not as prevalent a cause of rear planetary failure as the OEM bearing [described below at FIG. 6], the set of 32 washers 4 represents another independent small part that often fails by itself due to warping at extreme heat.

Nickel Boron Finish

Nickel boron was chosen as the most appropriate finish for thrust bearing 1 and pinion washers 4 owing to its proven success at reducing heat and friction [up to 12% on gears] while providing increased wear resistance due to its extreme hardness. In the preferred embodiment, UCT's UltraCem nickel-boron coating [Ni—B], now in its $5^{th}$ generation, was selected for its outstanding long-term corrosion and wear resistance. This is largely due to its low coefficient of friction, extreme hardness [1300 HV] with no hydrogen embrittlement, and higher density per cubic inch—all of which allows it to withstand extreme high temperature "surges" up to 1800° F., while dramatically reducing friction between mating surfaces all day long. Most importantly for bearing needles, UltraCem Ni—B coats all surfaces with a reliably uniform, even thickness which minimizes bearing-to-plate friction.

Detailed Description of Automatic Transmission Operation

Before proceeding to a detailed description of the instant invention, a description is in order as to how power is transferred from the engine through the input stages of the transmission to the rear planetary or 'reaction gear set' to which the instant invention directly applies. As a directional convention hereinafter, the transmission turns 'clockwise' when viewed from the front of the vehicle. The discussion is focused on operation in first or "Lo" and second gear, with particular emphasis on the planetary gears.

The automatic transmission is designed to anticipate the engine's needs and selects gears in response to various inputs [engine vacuum, road speed, throttle position, etc.] to maintain optimal application of the engine's power. Operations that were originally performed by a clutch and manual transmission are now accomplished automatically via fluid coupling, which allows a very slight, controlled slippage between the engine and transmission. This gives rise to two analogous main sections in the automatic transmission. The front section contains the fluid coupling or torque converter, which takes the place of the driver-operated clutch. The rear section contains the valve body assembly and the hydraulically-controlled gear units, which take the place of the manually-shifted standard transmission.

The purpose of an automobile transmission is to provide Neutral, Reverse, and Forward driving ranges that increase the torque or twisting force from the engine to the driving wheels as required for greater pulling power and performance. An automatic transmission allows engine torque and power to be transmitted to the drive wheels within a narrow range of engine operating speeds. Small hydraulic valves control application of different gear ratios as a demand response to the driver, based on position of the accelerator pedal, and as a preset response to engine conditions and road speed.

The transmission serves the dual purpose of protecting the engine at the two extremes of motion. At one extreme—very low road speeds, down to standing still—it allows the engine to turn fast enough to produce a swelling surge of power and torque to overcome the car's negative inertia. At the other extreme—very high vehicle speeds—it keeps the engine throttled back to relatively lower RPMs, which not only conserves gas but also minimizes costly wear and tear in the engine's worst-case operating envelope.

Basically, an automobile transmission is a form of lever that enables the engine to move heavy loads with less effort. As the heavy load or vehicle begins to move, less leverage or ratio is required to keep it moving. By providing a suitable number of levers or torque-multiplying ratios, improved performance and economy are possible over the entire driving range. Changing the ratio automatically relieves the driver of the responsibility of constantly selecting the best possible ratio for each condition, which makes driving easier, safer, and often more efficient.

The 4L60 transmission is a fully automatic unit consisting primarily of a three-element hydraulic torque converter with the addition of a converter clutch. Five multiple-disc clutches, one roller clutch, one sprag clutch, and a band provide the friction elements required to obtain the desired function of the compound planetary gear set.

The transmission uses a light fluid which performs three critical functions. First, it serves as the medium for transmitting power to the driving wheels; second, it operates the hydraulic control circuits; and third, it acts as a lubricant. The automatic transmission operates on the principle that fluids cannot be compressed, and that, when put in motion, will transfer the applied energy into any resisting force. This law of fluids can be visualized by considering two fans placed opposite each other. If either fan is turned on, it will begin to turn the opposite fan's blades. This principle is applied to operation of the fluid coupling and torque converter by using 'driving' and 'driven' members in place of opposing fan blades.

Torque Converter

This device fits between the engine and the transmission, providing a torque boost at low speeds and during acceleration, while leaving the two loosely coupled at rest. This allows the engine and transmission to be mated full-time without the need for a clutch. The torque converter provides a small amount of continuously variable power transmission between the fixed gear ratios.

The torque converter assembly serves three primary functions. First, it acts as a fluid coupling to smoothly connect engine power through oil to the transmission gear train. Second, it multiplies the torque or twisting effort from the engine when additional performance is desired. Thirdly, it provides direct drive through the torque converter.

The torque converter smoothly couples the engine to the planetary gears and overdrive unit through oil, and hydraulically provides additional torque multiplication when required [operation explained below]. The combination of the compound planetary gear set provides four forward ratios [Lo, 2nd, Drive, Overdrive] and one reverse.

Planetary Gears

The main gears in most hydraulic automatics are a compound planetary set. Gear ratios are selected by a system of brake bands and clutches, which are actuated by hydraulic servos controlled by the valve body. Planetary gears are used in automatic transmission as the basic means of multiplying the twisting force or torque from the engine. Planetary gears are so named because of their physical arrangement. They are always in mesh and thus cannot 'clash' like other gears that go in and out of mesh. The gears are designed so that several gear teeth are in mesh or in contact at once. This distributes the forces over several teeth for greater strength.

A planetary gear train consists of a center of sun gear 9, an internal gear 5—so called because of its internally-cut teeth—and a planetary carrier 2 which includes and supports the smaller planetary gears 3, commonly called pinions, as shown in the exploded view of FIG. 1. A planetary gear train can be used to increase or decrease torque, increase or decrease speed, reverse the direction of rotation, or function as a coupling or connector for direct drive. The shafts used with planetary gear trains are arranged on the same centerline, which results in a very compact unit.

A planetary gearset has three main components [as shown in FIG. 1]:
  Sun gear 9 [S]
  Planetary gears 3 and the planetary gears' Carrier 2 [C]
  Ring gear 5 [R]
  Each of these three components can be the input, the output or can be held stationary. Choosing which piece plays which role determines the gear ratio for the entire gearset. For example, a planetary gearset from a typical transmission has a ring gear 5 with 72 teeth and a sun gear 9 with 30 teeth, from which a lot of different gear ratios can be derived:

Planetary Gearset Configurations

| Config | Input | Output | Stationary | Calculation | Gear Ratio |
|---|---|---|---|---|---|
| GC1 | Sun (S) | Carrier (C) | Ring (R) | 1 + R/S | 3.40:1 |
| GC2 | Carrier (C) | Ring (R) | Sun (S) | 1/(1 + S/R) | 0.71:1 |
| GC3 | Sun (S) | Ring (R) | Carrier (C) | −R/S | −2.40:1 |

Moreover, locking any two of the three above components together will lock up the whole device at a 1:1 gear reduction.

The first gear ratio [GC1] above is a reduction—the output speed is slower than the input speed. The second ratio [GC2] is an overdrive—the output speed is faster than the input speed. The last ratio [GC3] is a reduction again, but the output direction is reversed. There are other ratios that can be configured from this planetary gear set, but the above 3 are the ones relevant to automatic transmissions.

Reduction

Increasing the twisting force or torque, by means of a planetary gear set, is generally known as operating in reduction, because there is always a decrease in the speed of the output member which is proportional to the increase in the output torque. Stated another way, with a constant input speed, the output torque increases as the output speed decreases.

When the internal gear is held stationary and power is applied to the sun gear in a clockwise direction, the planetary pinions rotate in a counterclockwise direction and 'walk' around the stationary internal gear, thus rotating the carrier assembly clockwise in reduction.

Direct Drive

Direct drive is obtained when any two members of the planetary gear train rotate in the same direction at the same speed. This forces the third member to turn at the same speed. In this condition, the pinions do not rotate on their pins, but act as wedges to drive the entire unit together as one rotating part.

Overdrive

Operating a transmission in overdrive enables the output speed of the transmission to be greater than the input speed. Thus, the vehicle can maintain a given road speed with less engine speed. This means better fuel economy with the slower running engine. When the output speed increases, the output torque decreases proportionally.

When the sun gear is held stationary and power is applied to the carrier in a clockwise direction, the planetary pinions rotate in a clockwise direction and 'walk' around the stationary sun gear, thus rotating the internal gear clockwise in overdrive, faster than the carrier.

Reversal of direction is obtained whenever the carrier is held from spinning free and power is applied to either the sun gear or internal gear. This causes the planet pinions to act as idlers, thus driving the output member in the opposite direction. In both cases, the output member is turning in a direction opposite the input member.

Valve Body

This component is the control center of the system. The valve body receives pressurized fluid from a main pump connected to the transmission's input. The pressure coming from this pump is regulated and runs a network of spring-loaded valves, check balls and servo pistons. The valves use the pump pressure and the pressure from a centrifugal governor on the output side [as well as hydraulic signals from the range selector valves and the throttle valve, or modulator] to control which ratio is selected on the gearset. As the car and engine change speed, the difference between the pressures changes, causing different sets of valves to open and close. The hydraulic pressure controlled by these valves drives the various clutch and brake band actuators, thereby controlling the operation of the planetary gearset to select the optimum gear ratio for the current operating conditions.

Torque Converter Operation

The torque converter consists of a converter clutch, a driving member, driven member, and a reaction member. These are known respectively as the pressure plate and damper assembly [clutch], pump [driving member], turbine [output or driven member] and stator [reaction member]. Changing of the gear ratios is fully automatic in relation to vehicle speed and engine torque. Vehicle speed and engine torque signals are constantly fed to the transmission to provide the proper gear ratio for maximum efficiency and performance at all throttle openings.

The converter cover is welded to the pump to seal all three members in an oil-filled housing. The converter cover is also bolted to the engine flywheel, which is in turn bolted directly to the engine crankshaft. The converter pump is therefore mechanically connected to the engine and turns at engine speed whenever the engine is running. The converter pump hub fits into the transmission oil pump and drives the oil pump clockwise when viewed from the front of the engine.

When the engine is running and the converter pump is spinning, it acts as a centrifugal pump, picking up oil at its center and discharging this oil at its rim between the blades. The shape of the converter pump shell and blades cause this oil to leave the pump [driving member] spinning in a clockwise direction toward the blades of the turbine [driven member]. As the oil strikes the turbine blades, it imparts a force causing the turbine to turn. When the engine is not spinning fast, the force of the oil leaving the pump is not great enough to turn the turbine with great torque. This allows the vehicle to stand in gear with the engine idling. As the throttle is opened and pump speed increases, the force of the oil increases and more engine power is transmitted to the turbine member and the gear train.

The stator [reaction member] is located between the pump [driving member] and the turbine [driven member], mounted on a one-way roller clutch which allows it to rotate clockwise only, and located such that all the oil passes through its blades. The purpose of the stator is to redirect the oil returning from the turbine back to the pump. The energy in the oil flow is thus used to assist the engine in turning the pump. This increases the force of the oil driving the turbine which, as a result, multiplies the torque or twisting force of the engine. With the engine operating at full throttle, and with the transmission in gear and the vehicle standing still, the converter is capable of multiplying engine torque by approximately 2:1.

As turbine speed and vehicle speed increases, the direction of the oil leaving the turbine changes. The oil flows against the rear side of the stator vanes in a clockwise direction. Since the stator is now impeding the flow of oil clockwise, its roller clutch automatically releases, allowing the stator to revolve freely on its shaft. Once the stator becomes inactive, there is no further multiplication of engine torque within the converter. At this point, the converter is merely acting as a fluid coupling, with the turbine turning at about the same speed as the pump.

Converter Clutch

In Park, Neutral, Reverse, and during some forward gear operations, the converter clutch is held in the release position by oil flowing from the clutch apply valve, through the turbine shaft, to a cavity between the converter clutch plate and the converter cover. This moves the clutch pressure plate away from the converter cover, releasing the converter clutch. To apply the converter clutch, the clutch apply valve redirects the oil to the apply circuit. The apply oil flows between the converter hub and the stator shaft. This reverses the oil flow and pushes the converter cover, creating a mechanical link between the engine and the turbine shaft.

To aid in reducing engine torsional pulsations, a damper assembly is incorporated in the converter clutch pressure plate. The spring-loaded damper assembly is splined to the converter turbine assembly. The converter clutch pressure plate is attached to the pivoting mechanism of the damper assembly. This rotating action allows the pressure plate to rotate independently of the damper hub, up to approximately 45 degrees. The rate of independent rotation is controlled by the pivoting mechanisms acting on the springs in the damper assembly. The spring-cushioning effect of the damper assembly aids in reducing the transfer of engine torque pulsation.

Converter clutch operation is determined by a series of controls, vehicle speed, and by Drive Range selection. The converter clutch, which is splined to the turbine hub, applies against the converter cover, providing a mechanical direct drive coupling of the engine to the planetary gears.

More specifically, the converter clutch pressure plate assembly is splined to the converter turbine assembly and the converter cover. The pressure plate is controlled by oil flowing on the turbine side, exerting a force against the plate. The plate is seated against the surface of the converter cover and provides a mechanical direct drive coupling of the engine to the turbine shaft. As oil is redirected to the converter cover side of the pressure plate, it moves away from the converter cover, releasing the converter clutch plate.

To transfer power from the converter to the transmission gear sets, the turbine shaft and the input housing are used. The front of the turbine shaft is splined to the turbine and pressure plate and the back end is permanently attached to the input housing.

Actually, the torque converter and turbine shaft form a simple type of transmission in themselves, where the converter pump is the input and the turbine shaft is the output. However, the automobile requires much more from the transmission, particularly in providing Reverse, Neutral, and additional torque multiplication.

Forward Clutch

To provide a means of connecting and disconnecting power input from the converter to the transmission gear train, a forward clutch is used. The forward clutch is composed of steel clutch plates, tanged to the input housing; composition faced clutch plates, splined to the forward clutch outer race; a forward clutch housing, and a clutch piston that hydraulically applies to hold the plates together.

Input Clutch Roller Assembly

As just described above, the forward clutch composition-faced plated are splined to the forward sprag outer race. The race and retainer assembly is splined to the input sun gear. A sprag clutch is a type of one-way clutch. In this application, the sprag assembly is installed between the outer race and inner race in such a way that the inner race and sun gear are forced to rotate at least as fast as the input housing, when the forward clutch is applied. The sprag clutch, however, will allow the sun gear to rotate faster than the input housing when needed. Whenever the forward clutch is applied, and the forward sprag clutch assembly is holding, power from the converter and turbine shaft is transferred to the input sun gear.

Input Planetary Gear Set

The input planetary gear set consists of an input sun gear, an input carrier and pinion assembly splined to the output shaft, and an input internal gear. Power through the forward clutch and sprag assembly causes the input sun gear to turn in a clockwise direction. With the weight of the vehicle restraining the output shaft and input carrier from turning, the input sun gear will try and turn the input internal gear counterclockwise. To make the input set effective in driving the vehicle, the input internal gear must be prevented from rotating counterclockwise.

Lo Roller Clutch

To prevent the input internal gear from rotating counterclockwise, it is splined to the reaction carrier. The reaction carrier is splined to the inner race of the Lo roller clutch. The outer cam is held stationary by the Lo and reverse clutch support, which is held stationary by the case. The rollers are installed between the race and cam in such a way that they prevent the reaction carrier and input internal gear from turning counterclockwise.

With the sun gear driving clockwise, and the internal gear restrained from turning counterclockwise, the input carrier is forced to drive the output shaft in reduction at a ratio of about 3.06:1. This gear reduction, combined with the maximum converter torque multiplication of about 2.0:1, gives an overall transmission first gear starting ration of approximately 6.12:1, or 6.12 input to 1 output.

The high gear ratio in first gear provides the torque multiplication necessary to start the vehicle moving. The efficiency of the engine depends upon it maintaining its speed, or RPMs, in a narrow range. As vehicle speed increases, less torque multiplication is needed for maximum efficiency. Thus, it is desirable to shift the transmission to a lower ratio of second gear.

Reaction Gear Set

In first gear, the input internal gear 6 is prevented from turning counterclockwise giving the transmission full torque multiplication [3.06:1] through the input gear set. If the input internal gear 6 were to start rotating clockwise in reduction, still using the sun gear as input and the carrier as output, the torque multiplication would change and the transmission would be in a different gear—second gear.

In first gear, the reaction internal gear, splined to the output shaft, is rotating clockwise in reduction [3.06:1]. The reaction carrier is held stationary by the lo roller clutch. The reaction sun gear is driven counterclockwise by the reaction internal gear. In second gear, the reaction sun gear is held, forcing the reaction carrier and the input internal gear to rotate from first gear to second gear, as the counterclockwise rotation of the reaction sun gear is stopped. This is accomplished by adding the reaction sun shell, the reverse input drum, and the 2-4 band.

In first gear, the smaller sun gear is driven clockwise by the turbine in the torque converter. The planet carrier tries to spin counterclockwise, but is held still by the one-way clutch (which only allows rotation in the clockwise direction) and the ring gear turns the output. The small gear has 30 teeth and the ring gear has 72, the gear ratio is:

$$\text{1st Gear Ratio} = -R/S = -72/30 = -2.4:1$$

So the rotation is negative 2.4:1, which means that the output direction would be opposite the input direction. But the output direction is really the same as the input direction— this is where the trick with the two sets of planets comes in. The first set of planets engages the second set, and the second set turns the ring gear; this combination reverses the direction. You can see that this would also cause the bigger sun gear to spin; but because that clutch is released, the bigger sun gear is free to spin in the opposite direction of the turbine [counterclockwise].

2-4 Band

The reaction sun shell is splined to the reaction sun gear and tanged to the reverse input drum. With the 2-4 band hydraulically applied, the reverse input drum, reaction sun shell, and reaction sun gear are held, preventing them from rotating.

The power flow is now as follows: converter output is transmitted through the input housing, the forward clutch, and the forward clutch sprag assembly to the input sun gear. The input carrier, rotating in reduction, transmits power through the output shaft to the reaction internal gear. The reaction internal gear forces the reaction pinions to rotate clockwise on their pins and walk around the stationary reaction sun gear. This rotates the reaction carrier and input internal gear clockwise in a second reduction 1.44:1.

Power input is through the input sun gear and output is through the input carrier as it was in $1^{st}$ gear, but the input internal gear is rotated clockwise I reduction to change the overall gear ration to approximately 1.63:1, or 1.63 input to 1 output, as second gear.

In order to get the ratio needed for second gear, the transmission acts like two planetary gearsets connected to each other with a common planet carrier. The first stage of the planet carrier actually uses the larger sun gear as the ring gear. So the first stage consists of the sun (the smaller sun gear), the planet carrier, and the ring [the larger sun gear]. The input is the small sun gear; the ring gear [large sun gear] is held stationary by the band, and the output is the planet carrier. For this stage, with the sun as input, planet carrier as output, and the ring gear fixed, the formula is:

2nd Gear Ratio [1st stage]=1+$R/S$=1+36/30=2.2:1

The planet carrier turns 2.2 times for each rotation of the small sun gear. At the second stage, the planet carrier acts as the input for the second planetary gear set, the larger sun gear (which is held stationary) acts as the sun, and the ring gear acts as the output, so the gear ratio is:

2nd Gear Ratio [2nd stage]=1/(1+$S/R$)= 1/(1+36/72)=0.67:1

To get the overall reduction for second gear, the first stage is multiplied by the second, 2.2×0.67 yields a 1.47:1 reduction.

3-4 Clutch

As the vehicle continues to accelerate and the engine's most efficient speed [RPMs] would again be exceeded, it becomes necessary to shift the transmission to a lower ratio a second time. This is accomplished by releasing the 2-4 band and adding the 3-4 clutch, comprising a piston, apply ring, and clutch plates.

The 3-4 clutch steel plates are splined to the input housing which is in turn welded to the turbine shaft. The 3-4 clutch fiber plates are splined to the input internal gear. The 3-4 clutch plates are hydraulically applied by the 3-4 piston located in the input housing. With the 3-4 clutch applied, power travels from the input housing to the input internal gear, turning the front internal gear at turbine speed. The forward clutch is still applied, providing power from the input housing, through the input roller clutch to the input sun gear, at turbine speed. The input sun and internal gears are now turning at the same speed, turbine speed. The input carrier pinions act as wedges forcing the input carrier and the output shaft to turn at the same speed, turbine speed. The transmission is now in direct drive.

Most automatic transmissions have a 1:1 ratio in third gear. As described above, this can be secured by locking together any 2 of the 3 parts of the planetary gear, resulting in a 1:1 output. With the arrangement in this gearset it is even easier—just engage the clutches that lock each of the sun gears to the turbine. If both sun gears turn in the same direction, the planet gears lockup because they can only spin in opposite directions. This locks the ring gear to the planets and causes everything to spin as a unit, producing a 1:1 ratio.

Drive Range—Overdrive

When the vehicle is at cruising speed, with the transmission in direct drive, the engine RPMs are greater than what is required to maintain vehicle speed. To increase fuel economy, the transmission can now shift into overdrive. To shift the transmission into overdrive, the 2-4 band is again applied, holding the reverse input housing, the reaction sun shell, and the reaction sun gear stationary. Power flow is now transferred, at turbine speed, from the input housing through the 3-4 clutch to the input internal gear and reaction carrier. The reaction pinions are forced to 'walk' around the stationary reaction internal gear clockwise, in overdrive, at approximately 0.70:1 ratio.

It should be noted that the forward clutch is still applied, but it is ineffective. This is because the input sun gear is now being driven faster than the input housing by the input carrier. This in turn causes the forward sprag clutch to overrun, which renders the forward clutch ineffective.

By definition, an overdrive has a faster output speed than input speed. It's a speed increase—the opposite of a reduction. In many transmissions, engaging the overdrive accomplishes two things at once. In order to improve efficiency, some cars have a mechanism that locks up the torque converter so that the output of the engine goes straight to the transmission.

In such a transmission, when overdrive is engaged, a shaft that is attached to the housing of the torque converter [which is bolted to the flywheel of the engine] is connected by clutch to the planet carrier. The small sun gear 'freewheels' while the larger sun gear is held by the overdrive band. Nothing is connected to the turbine; the only input comes from the converter housing. As shown for config GC2, described above, the gear set is configured with Planet Carrier for input, Sun Gear [S] fixed and Ring Gear [R] for output:

Overdrive Ratio=1/(1+$S/R$)=1/(1+36/72)=0.67:1

Hence, the output spins once for every two-thirds of a rotation of the engine. That is, if the engine is turning at 2000 rpm, the output speed is 3000 rpm. This allows cars to drive at freeway speed while the engine speed stays nice and slow.

Reverse

Reverse is very similar to first gear. The difference is that, instead of the small sun gear being driven by the torque converter turbine, the bigger sun gear is driven, and the small one 'freewheels' in the opposite direction. The planet carrier is held by the reverse band to the housing. Referring back to config GC3, described above, the reverse gear ratio here becomes:

Reverse Ratio=−$R/S$=72/36=2.0:1

Thus, the gear ratio in reverse is a slightly less than first gear in this transmission.

Final Gear Ratios

This transmission has four forward gears and one reverse gear. The following table summarizes the gear ratios, inputs, outputs, and fixed members for each of these gears:

| Gear | Input | Output | Fixed | Gear Ratio |
|---|---|---|---|---|
| 1st | 30-tooth sun | 72-tooth ring | Planet carrier | 2.40:1 |
| 2nd | | | | |
| [$1^{st}$ stage] | 30-tooth sun | Planet carrier | 36-tooth ring | 2.20:1 |
| [$2^{nd}$ stage] | Planet carrier | 72-tooth ring | 36-tooth sun | 0.67:1 |
| 2nd Total | [$1^{st}$ stage × $2^{nd}$ stage] | | | 1.47:1 |
| 3rd | 30-/36-tooth suns | 72-tooth ring | | 1.0:1 |
| OD | Planet carrier | 72-tooth ring | 36-tooth sun | 0.67:1 |
| Reverse | 36-tooth sun | 72-tooth ring | Planet carrier | −2.00:1 |

Preferred Embodiment

Figure 2:
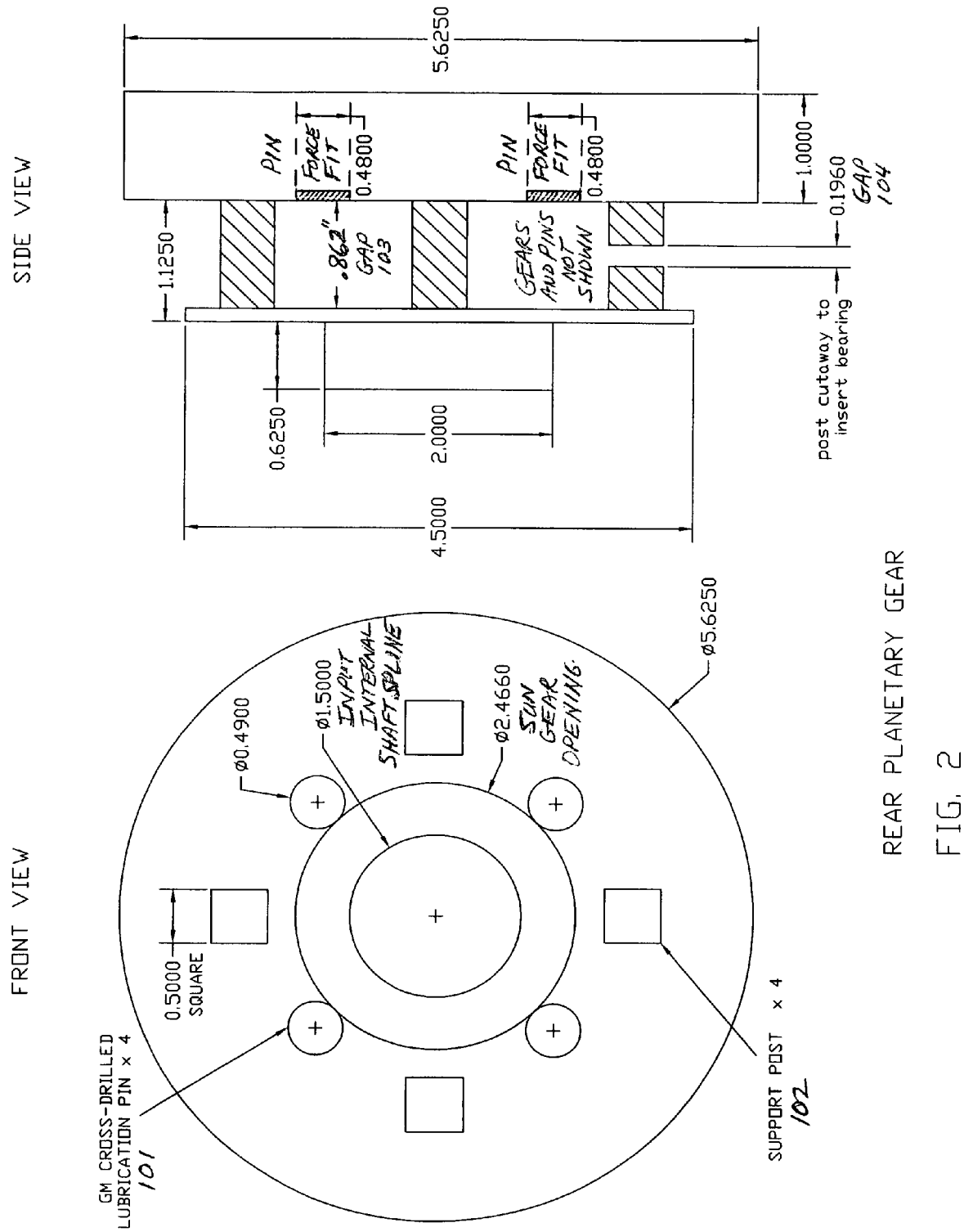
FIG. 2 shows a diagram of the reaction carrier hereinafter referred to as the "rear planetary" in more detail, including hole patterns for GM's four cross-drilled lubrication pins and the planetary body's four support posts, one of which has been cutaway to provide access to install the new rear thrust bearing of the instant invention.

FIG. 2 is a simplified depiction of the rear planetary 2, otherwise shown in more graphic detail in FIG. 1. The depiction shows two important features intrinsically related to the instant invention.

Figure 3:
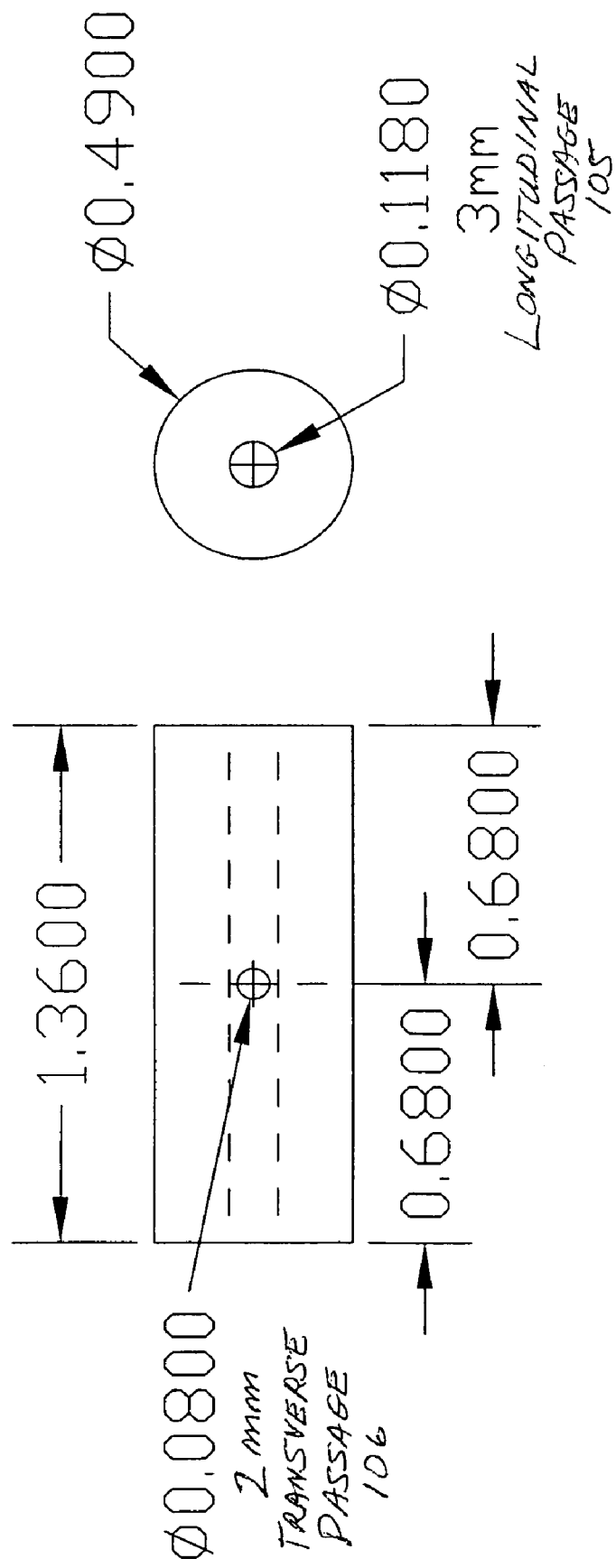
FIG. 3 is a blowup of GM's cross-drilled lubrication pin, introduced in 1993 as an attempt to resolve the flood of 4L60 rear planetary failures.

First in FIG. 2 are the 4 cross-drilled lubrication pins 101, evenly disposed 90° apart around the input spline opening on the front of the planetary 2. FIG. 3 shows the structure of pins 101 in greater detail, revealing how they were expected to improve lube flow both horizontally and vertically, via longitudinal passage 105 and transverse passage 106, respectively. These lube pins are the last remaining vestige of GM's failed attempt in 1993 to resolve the overheating problem that had cropped up in planetary 2.

The significance of these lubrication pins 101 to the instant invention is that GM engineers recognized they had an overheating problem and generated a substantial engineering mod to correct it, albeit unsuccessful. This fact alone is a testament to the creative value of the present modified bearing assembly 1 in successfully correcting GM's problem which, by default, has become every 4L60 owner's problem.

Second in FIG. 2 are the 4 square support posts 102 which provide a 0.862" external gap 103 to mount the four planetary gears 3, shown in more graphic detail in FIG. 1. As shown in FIG. 2, these posts provide the simplest access path to insert the robust but slightly-oversized thrust bearing 1. The method of assembly to insert this 3-piece bearing requires more than meets the eye, including special welding steps derived from many hours of trial and error:

Method of Assembly: How to Install the Modified Bearing Assembly

Rear Planetary 1: first, the OEM bearing seat at the rear of the frame must be machined out from 2.285"==>2.431" diameter, milling the pocket depth out from 0.075"==>0.122" deep [per FIG. 6]

Planetary Post 102: next, one of posts 102 must be cut open to a 0.196" width sufficient to pass the bearing parts through [gap 104 on FIG. 2]

Bearing Assembly 1: next, each part of the bearing assembly—the back race, bearing cage, and front race—must be snug-fit into the bearing seat Planetary Post 102: finally, the segment cut out of the post 102 must be welded back into the open slot, with the following safeguards against closing down or "shrinking" the surrounding frame from its original size Specialized Welding Steps: How to Avoid Warp and Shrinkage Drill down the backside of the planetary into the post that has been cut Tap ¼" threads in the hole and insert a ¼" bolt into the tapped hole With a micrometer, measure the frame's gap on both sides of the cut post Then measure the same gap on both sides of an uncut post as a reference Turn the bolt down through the top part of the cut post to spread the planetary gap wider than the uncut post by 0.009"+/−0.001"

This results in a cut post gap @ 0.871" versus the uncut post gap @ 0.862"

Weld the cut segment back in—the cut post gap will shrink to 0.862"

Finally, verify that the cut post has shrunk back to its original height

Original OEM Bearing

FIG. 4 shows dimensions of the 3 components of the OEM bearing 201—namely, the front race 202, the bearing cage 203, and the back race 204—which compress into a very compact unit of 0.14"×2.155" diameter when fully assembled 205, as shown on the right-hand corner of FIG. 4. This unit is not easily torn down into the breakout depicted since the front race 202 is press fit into bearing cage 203. Then, both components are slip fit into back race 204. But here again, the components 'snap' hard into place via 3 edge crimps on the ID 207 of the front race and the OD 208 of the back race.

The workhorses of this whole configuration are the 50 needle bearing 206 disposed radially equidistant around the bearing cage 203. These needles are relatively small at 0.105"×0.078" diameter, which translates to a very small volume of 0.0005" cubic inches. Totally apart from the lubrication issues addressed by GM engineers in 1993, the modest size of these 50 bearings 206 may actually explain why they tend to fail under extreme pressure and/or sustained heat buildup, as will next be explained with respect to the present bearing mod.

Improved Thrust Bearing Assembly

FIG. 5 shows dimensions of the 3 components of the instant invention, the improved thrust bearing assembly 301—namely, the front race 302, the bearing cage 303, and the back race 304—which compress into a compact unit of 0.19"× 2.425" diameter when fully assembled 305, as shown on the right-hand corner of FIG. 5. In contrast to the OEM bearing of FIG. 4, this bearing 301 is, by its nature, easily torn down into the breakout depicted since the bearing cage 303 is merely slip fit into the back race 304 and front race 302 is similarly slip fit on top of bearing cage 303 within back race 304.

This is by design since bearing 301 is not available off-the-shelf, but rather, must be assembled from 3 different sources. This unique slip-fit relation between the 3 components is an integral part of the novel bearing design, in that it allows the front race 302 to "float" independently above the cage 303 beneath it and the back race 304, as well. This "floating" front race actually serves two purposes: since it can rotate independently of bearing cage 303 beneath it, for brief periods it can absorb some rotational motion on its own, before the cage gets up to full rotational speed; and, since it is not connected physically to back race 304, it can help absorb any sudden, severe "head on" impact from the sun gear.

The workhorses of this whole configuration are the 34 needle bearing 306 disposed radially equidistant around the bearing cage 303. Compared to the OEM bearing in FIG. 4, these needles are extremely large at 0.236"×0.118" diameter, which translates to a very large volume of 0.0026" cubic inches. The enormous size of these 34 bearings 306 may help explain why they have survived the most extreme pressure and sustained heat buildup that any transmission bearing can be subjected to, as has been described earlier.

Comparison of Original OEM Bearing to Modified Bearing Assembly

FIG. 6 is a convenient chart that compares the 16 most crucial parameters, side-by-side, between the OEM bearing 201 and the present thrust bearing assembly 301. Seeing this data side-by-side makes it easy to visualize why bearing 301 has succeeded where the OEM bearing 201 has generally failed. While there is a significant improvement shown for all 16 parameters, two of the most crucial parameters are parameter [4], Size of the Needle Bearing, and parameter [16], Size of the Bearing Seat. They illustrate some of the intrinsic value of the instant design: a bearing with needles 414% larger has been neatly compressed into a token increase of 84% in bearing seat size.

Advantages of the Modified Bearing Assembly Over the OEM Bearing

FIG. 7 is a companion chart to FIG. 6. It delineates the primary functional advantages signified by each of the 16 parameters listed in FIG. 6. That is, given the "percent increase" [right-most column] of the modified bearing assembly 301 over the OEM bearing 201, FIG. 7 explains how each increase translates into an incremental performance advantage. Taken collectively, however, the sum effect of all 16 parameters add up to quite significant overall advantages A1 through A3, shown as the "Bottom Line." Of particular note is the exponential increase in dynamic load rating [note 1].

Alternative Embodiments

While the invention has been fully described in connection with what is presently considered to be the most practical and preferred embodiment, it should be understood that the invention is not to be limited to the specific disclosed embodiment. On the contrary, the invention is intended to cover various modifications and equivalent arrangements and embodiments that are included within the spirit and scope of the appended claims.

For example, using alternative installation steps for bearing assembly 1, or switching to alternate finishes for bearing 1 and washers 4, or applying the same bearing assembly modifications disclosed herein to other areas of the transmission, lies well within the spirit and scope of the claims.

There are other variations for installing bearing assembly 1 that lie within the spirit and scope of the instant claims. For example, all 4 rear planetary posts could be cut, drilled and tapped, allowing the two halves to be rejoined by case hardened bolts after the bearing is seated [see FIG. 2]. A different bearing with a smaller OD at the OEM level could be used, albeit sacrificing some of the bearing's critical heat dissipation capability [per OEM specs in FIG. 4]. A new rear planetary casing could be custom cast, for example, with a removable input spacer spline and a wider and deeper bearing seat [per the specs in FIG. 4]. A two-piece split bearing could be inserted and seated piece-by-piece directly through the front input spline opening, albeit risking the integrity of the present bearing's smooth surface at its coupling joints.

Nickel boron was chosen as the most durable finish for the thrust bearing 1 and pinion washers 4, owing to its proven success at reducing friction and heat generation while providing increased wear resistance due to its extreme hardness. In the preferred embodiment, however, other more expensive and/or less appropriate finishes could be applied—such as electroless nickel composite, plated nickel cobalt, cubic boron nitride, titanium nitride, or hard chrome—without departing from the spirit and scope of the instant claims.

Moreover, applying the bearing modifications shown herein to other areas of the transmission also lies within the spirit and scope of the claims. For example, a similar bearing assembly could be tailored to the dimensions of the front planetary gear. While this would be functionally equivalent to the present invention, it would not actually improve 4L60 transmission integrity very much, since only a small fraction of the total 4L60 failures can be directly attributed to the front planetary.

The invention claimed is:

1. In an OEM automotive automatic transmission including a rear planetary with a bearing seat enlarged from its original OEM size, a highly-durable rear planetary bearing assembly comprising:
   a front race with flat surfaces on both sides;
   a bearing cage containing enlarged cylindrical needle bearings; and
   a back race with a flat rear surface and cupped side walls, such that the bottom of said side walls fits snugly into said enlarged rear bearing seat;
   wherein said bearing cage and said front race are slip fit into said back race, and, upon being slip fit into said back race, the front race is held captive by the back race yet remains unattached, such that the front race can still spin freely without oscillation during operation of said transmission, so as to substantially increase the dynamic load rating for impulse loads and the long-term durability for normal loads.

2. A highly-durable rear planetary bearing assembly according to claim 1, wherein said rear bearing seat has been enlarged by less than 85% from its OEM configuration, while at the same time, said cylindrical needle bearings are enlarged by more than 400% over the original OEM rear thrust bearings provided with the transmission, so as to substantially increase the dynamic load rating for impulse loads and the long-term durability for normal loads.

3. A highly-durable rear planetary bearing assembly according to claim 1, further comprising a sun gear turning under power, wherein, prior to said operation of said transmission, the front race, the bearing cage, and the back race are each coated with nickel boron, such that, upon said operation of said transmission, the front race, the bearing cage, and the back race, upon making normal powered contact with the sun gear, run with less friction among themselves and with the sun gear, thereby precluding excessive heat buildup in the bearing assembly that could cause premature failure.

4. A highly-durable rear planetary bearing assembly according to claim 3, further comprising a set of planetary gears, each being bounded by pinion washers at each end, wherein, prior to said operation of said transmission, said pinion washers are each coated with nickel boron, such that, upon said operation of said transmission, each of the planetary gears, upon making sustained severe powered contact with the sun gear, runs with less friction with the pinion washers at each of its ends, thereby precluding excessive heat buildup in the pinion washers that could cause premature failure.

5. In an automotive automatic transmission, a highly-durable rear planetary comprising:
   a bearing seat enlarged from the nominal OEM size,
   a front race with flat surfaces on both sides;
   a bearing cage containing enlarged cylindrical needle bearings; and
   a back race with a flat rear surface and cupped side walls, such that the bottom of said side walls fits snugly into said enlarged rear bearing seat;
   wherein said bearing cage and said front race are slip fit into said back race, and, upon being slip fit into said back race, the front race is held captive by the back race yet remains unattached, such that the front race can still spin freely without oscillation during operation of said transmission, so as to substantially increase the dynamic load rating for impulse loads and the long-term durability for normal loads over the corresponding OEM ratings.

6. A highly-durable rear planetary according to claim 5, wherein said rear bearing seat has been enlarged by less than 85% from the nominal OEM size while, at the same time, said cylindrical needle bearings are enlarged by more than 400% over the original OEM rear thrust bearings provided with OEM transmissions, so as to substantially increase the dynamic load rating for impulse loads and the long-term durability for normal loads over the corresponding OEM load rating and OEM long-term durability.

7. A highly-durable rear planetary according to claim 5, further comprising a sun gear turning under power, wherein, prior to said operation of said transmission, the front race, the bearing cage, and the back race are each coated with nickel boron, such that, upon said operation of said transmission, the front race, the bearing cage, and the back race, upon making normal powered contact with the sun gear, run with less friction among themselves and with the sun gear, thereby precluding excessive heat buildup in the bearing assembly that could cause premature failure.

8. A highly-durable rear planetary according to claim 7, further comprising a set of planetary gears, each being bounded by pinion washers at each end, wherein, prior to said operation of said transmission, said pinion washers are each coated with nickel boron, such that, upon said operation of said transmission, each of the planetary gears, upon making sustained severe powered contact with the sun gear, runs with less friction with the pinion washers at each of its ends, thereby precluding excessive heat buildup in the pinion washers that could cause premature failure.

9. A method of assembly for a highly-durable automatic transmission rear planetary, having a set of external frame posts to maintain a fixed gap for its planetary gears, and an OEM bearing seat of nominal OEM size to cradle a thrust bearing consisting of a front race, a bearing cage, and a back race, comprising:
 enlarging the thrust bearing seat from said nominal OEM size;
 cutting open a segment in one post larger than each race or cage;
 inserting the thrust bearing through the cut post;
 seating the thrust bearing into said enlarged bearing seat;
 welding the cut segment back into the cut post,
such that the surrounding frame does not warp or shrink from said fixed gap.

10. A method of assembly for a highly-durable rear planetary according to claim 9, wherein said inserting and seating steps further comprise:
 inserting the back race through the cut post;
 seating the back race snugly into said enlarged bearing seat;
 inserting the bearing cage through the cut post;
 inserting the bearing cage into the seated back race via a slip fit;
 inserting the front race through the cut post;
 inserting the front race into the seated back race via a slip fit,
such that the front race floats freely unattached atop said bearing cage.

11. A method of assembly for a highly-durable rear planetary according to claim 10, wherein said welding step further comprises:
 drilling down the backside of the planetary frame into the cut post;
 tapping ¼" threads in the drilled hole and insert a ¼" bolt in the hole;
 measuring the gap on both sides of one of the uncut posts;
 turning the bolt down through the cut post to spread the gap next to the cut post by 0.009" wider than the gap measured at the uncut post;
 welding the cut segment back into the cut post; and
 verifying the cut post has shrunk back to its original height.

12. A method of assembly for a highly-durable rear planetary according to claim 9, further comprising:
 coating said front race, bearing cage, and back race with nickel boron prior to said inserting and seating steps, so as to preclude excessive heat buildup in the assembled thrust bearing that could cause premature failure.

13. A method of assembly for a highly-durable rear planetary according to claim 12, further comprising:
 coating multiple sets of pinion washers with nickel boron prior to said inserting and seating steps, so as to preclude excessive heat buildup in the assembled pinion washers that could cause premature failure.

14. A method of assembly for a highly-durable rear planetary after said verifying step in claim 13, further comprising:
 inserting a set of pinion washers coated with nickel boron at each end of each planetary gear, in place of any original OEM washers.

\* \* \* \* \*